United States Patent
Liu et al.

(10) Patent No.: US 10,866,462 B2
(45) Date of Patent: Dec. 15, 2020

(54) BACKLIGHT MODULE AND TERMINAL

(71) Applicants: Chongqing BOE Optoelectronics Technology Co., Ltd., Chongqing (CN); BOE Technology Group Co., Ltd., Beijing (CN)

(72) Inventors: Xiaolong Liu, Beijing (CN); Taeyup Min, Beijing (CN); Zhi Zhang, Beijing (CN); He Sun, Beijing (CN); Keguo Liu, Beijing (CN); Gang Chen, Beijing (CN); Taoliang Tang, Beijing (CN); Changgong Zhu, Beijing (CN); Jianghong Wen, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

(*) Notice: Subject to any disclaimer, the term of this patent is extended or adjusted under 35 U.S.C. 154(b) by 127 days.

(21) Appl. No.: 16/334,956

(22) PCT Filed: May 11, 2018

(86) PCT No.: PCT/CN2018/086516
§ 371 (c)(1),
(2) Date: Mar. 20, 2019

(87) PCT Pub. No.: WO2018/228102
PCT Pub. Date: Dec. 20, 2018

(65) Prior Publication Data
US 2020/0026126 A1 Jan. 23, 2020

(30) Foreign Application Priority Data
Jun. 14, 2017 (CN) .................... 2017 2 0693513 U

(51) Int. Cl.
G02F 1/13357 (2006.01)
F21V 17/10 (2006.01)
(Continued)

(52) U.S. Cl.
CPC ........ *G02F 1/133608* (2013.01); *F21V 17/10* (2013.01); *G02B 6/0088* (2013.01);
(Continued)

(58) Field of Classification Search
CPC ......... G02F 1/133602; G02F 1/133608; G02F 1/13357; G02F 1/1333; F21V 17/10; G02B 6/0088; G02B 6/00; G02B 2001/133314
See application file for complete search history.

(56) References Cited

U.S. PATENT DOCUMENTS

| 5,335,100 A | 8/1994 | Obata |
| 6,593,979 B1 | 7/2003 | Ha et al. |

(Continued)

FOREIGN PATENT DOCUMENTS

| CN | 101672991 A | 3/2010 |
| CN | 103148459 A | 6/2013 |

(Continued)

OTHER PUBLICATIONS

The International Search Report, for International Application No. PCT/CN2018/086516 dated May 11, 2018, 7 pages.
(Continued)

*Primary Examiner* — Joseph L Williams
*Assistant Examiner* — Jose M Diaz
(74) *Attorney, Agent, or Firm* — Westman, Champlin & Koehler, P.A.

(57) ABSTRACT

A backlight module is provided, including: a back frame in a box shape opening at an opening side; a sealant frame within the back frame; and a light guide plate and a
(Continued)

membrane on the light guide plate, both surrounded by the sealant frame; the sealant frame has a step structure including a base portion whose upper surface is a step surface facing towards the opening side and a surrounding wall; the sealant frame has at least one positioning notch recessed into the base portion and the surrounding wall; the membrane has at least one positioning lug at an edge thereof, below the step surface and extending into the positioning notch; and the backlight module includes at least one positioning insert within a respective positioning notch and having a plate piece whose upper surface being an auxiliary supporting surface facing towards the opening side and flush with the step surface.

16 Claims, 4 Drawing Sheets

(51) Int. Cl.
 *F21V 8/00* (2006.01)
 *G02F 1/1333* (2006.01)
(52) U.S. Cl.
 CPC ............ *G02F 1/133602* (2013.01); *G02F 2001/133314* (2013.01)

(56) References Cited

U.S. PATENT DOCUMENTS

| | | | | |
|---|---|---|---|---|
| 7,626,747 | B2* | 12/2009 | Murakata | ............ G02B 6/0088 |
| | | | | 349/58 |
| 8,770,820 | B2* | 7/2014 | Cho | ................ F21V 13/12 |
| | | | | 362/618 |
| 10,416,499 | B2* | 9/2019 | Yu | ................. G02F 1/133308 |
| 2007/0014078 | A1* | 1/2007 | Cheng | ............ G02B 6/0088 |
| | | | | 361/600 |
| 2016/0004007 | A1 | 1/2016 | Chen et al. | |
| 2018/0106961 | A1* | 4/2018 | Hwang | ............ G02B 6/0053 |
| 2020/0026127 | A1* | 1/2020 | Lin | ............ G02F 1/133308 |

FOREIGN PATENT DOCUMENTS

| | | |
|---|---|---|
| CN | 104197242 A | 12/2014 |
| CN | 204313140 U | 5/2015 |
| CN | 206773348 U | 12/2017 |
| JP | 2001142054 A | 5/2001 |

OTHER PUBLICATIONS

The Written Opinion, including English translation of Box V, for International Application No. PCT/CN2018/086516 dated May 11, 2018, 5 pages.

* cited by examiner

BACKLIGHT MODULE AND TERMINAL

This application is a Section 371 National Stage Application of International Application No. PCT/CN2018/086516, filed on May 11, 2018, entitled "BACKLIGHT MODULE AND TERMINAL", which has been published, which claims priority to Chinese Patent Application Invention No. 201720693513.4 filed on Jun. 14, 2017 in the State Intellectual Property Office of China, the whole disclosure of which are incorporated herein by reference.

BACKGROUND OF THE DISCLOSURE

Field

Embodiments of the present disclosure generally relate to but are not limited to the technical field of liquid crystal display technology, and in particular, to a backlight module configured to support a display screen, and a display device.

Background

In a backlight module of a display device (e.g., a display panel of a laptop computer), in a relevant condition, by way of example, in addition to a backlight source, there are further provided a back frame which functions as a basis for installing various parts and components, a sealant frame accommodated within the back frame, and a light guide element provided to fit with both the back frame and the sealant frame, with a step structure (which is configured to support the light guide element) being provided on an inner side face of the sealant frame. And above the backlight module, especially above the light guide element, a display screen is provided for covering the former. The light guide element comprises a reflector sheet, a light guide plate, and an additional membrane; and the membrane comprises a diffusion sheet, a lower prism sheet and an upper prism sheet. The reflector sheet is adhered to the back frame; one portion of the light guide plate (e.g., an periphery thereof) is inserted below the back frame and the sealant frame, while the other portion of the light guide plate (e.g., at least a portion of inner portion thereof which is surrounded and delimited inside the periphery thereof, e.g., a portion thereof being located adjacent to the periphery) is adhered to the back frame. The membrane comprises the diffusion sheet, the lower prism sheet and the upper prism sheet sequentially located above the light guide plate. By taking a backlight module in which at least one lamp bar is arranged on side portions thereof along a long edge direction of the sealant frame as an example, typically, one or two positioning lugs may be designed to be arranged on two side portions of the membrane in a short edge direction of the sealant frame, and the positioning lugs may extend into positioning notch(s) formed into the sealant frame; and it is a conventional way to fix/secure the membrane by the positioning lug(s) that the positioning lug(s) and the sealant frame are adhered together with a first adhesive tape, so as to achieve a purpose of fixing and limiting the membrane in place by simultaneous fit insertion and adhesion; and meanwhile, it is required that an upper surface of the first adhesive tape once adhered is flush with a step surface of the sealant frame which is provided at a relatively low location of the sealant frame and is configured to support the light guide element and the display screen thereon, i.e., the upper surface of the first adhesive tape and the step surface are arranged in a coplanar manner so as to prevent any light leakage phenomenon in a condition of 'full-black' or "totally black" pictures due to existence of step mismatch therebetween.

In order to ensure fixation functionality and assembly convenience of the membrane, the positioning lug should not be dimensioned excessively small. The positioning lug may penetrate the sealant frame in the long edge direction of the sealant frame and extend into the corresponding positioning notch of the sealant frame, and the positioning notch above the positioning lug may be formed to be a gap. Once a second adhesive tape is adhere thereto, then, since the gap is closed by the second adhesive tape, then a hollowed space is formed below the second adhesive tape. As such, due to the existence of the hollowed space, the second adhesive tape may readily recess (e.g, downwards) and may in turn collapse, under an external force, resulting in poor or defective appearance. Even if the second adhesive tap recesses excessively deeply, then a portion of the second adhesive tape adjacent to the recessed portion of the second adhesive tape may be upwarped, i.e., tilted upwards, resulting in a light leakage defect of the second adhesive tape.

Moreover, the membrane may have a certain expansion-retraction amount. Therefore, as far as the specific fixation way of the membrane is concerned, an expansion space may be reserved in advance for extension or retraction of the membrane, or otherwise the membrane may be wrinkled due to insufficient space for accommodating the membrane, and further a poor display quality may be brought about. If the first adhesive tape is adopted to fix the membrane, then a filling material (e.g., rubber filler) may not be used to fill the gap formed at the positioning lug of the membrane. This is because once the filling material is filled into the gap, then, for example, two aspects of adverse effects may be incurred thereby; specifically, on one hand, it may easily interfere with the expansion of the membrane; and on the other hand, it may easily result in a generation of foreign materials in the filling material within the backlight module (for example, the filling material may absorb or adsorb airborne moisture and/or airborne dust). Furthermore, a base material of the first adhesive tape is typically for example polyester resin which is softer than a material of the sealant frame; and in consideration of expansibility of the membrane, then a spacing should be reserved between the first adhesive tape and the membrane. As such, an upper surface of the first adhesive tape at the positioning lug may typically sink below the step surface by more than 0.1 mm so as to form the step mismatch. As to a backlight module in a display device which may for example be a display panel of a laptop computer product, the step mismatch may result in unevenness of the first adhesive tape and the step surface, resulting in a L0 light leakage of a certain degree (the 'L0' light leakage is for example defined as white light rays which can be observed in a black picture).

In order to ensure that the upper surface of the first adhesive tape is flush with the step surface, at least one positioning slot may be additionally provided into the step surface, a depth of the at least one positioning slot is set to be identical to a thickness of the first adhesive tape, and the first adhesive tape is fixed by adhesion onto the sealant frame (across the positioning notch), with both ends of the first adhesive tap being adhered into the positioning notch; and in a practical adhesion process, both ends of the first adhesive tape may easily be skewed and in turn be at least partially adhered outside the positioning notch. The skew adhesion of the first adhesive tape may result in that a portion of the first adhesive tape which is adhered outside the positioning notch is higher than the step surface, i.e., a step mismatch is thus incurred on the step surface, still resulting in the L0 light leakage as set forth above. The step mismatch may also damage the membrane in a dynamic pressure test and/or a static pressure test.

SUMMARY

The embodiments of the present disclosure have been made to overcome or alleviate at least one aspect of the above mentioned disadvantages and/or shortcomings in the prior art, by providing a backlight module configured to support a display screen and a display device.

Following technical solutions are adopted in exemplary embodiments of the invention.

According to one aspect of embodiments of the disclosure, there is provided a backlight module configured to support a display screen, comprising: a back frame which is in a box shape and opens at an opening side thereof; a sealant frame which is in a form of hollowed closed frame and is accommodated within the back frame by abutting against inside of the back frame; and a light guide element which fits with the back frame and the sealant frame, and comprises a light guide plate and a membrane, both the light guide plate and the membrane being located within a region surrounded by the sealant frame and the membrane being further located on the light guide plate; the sealant frame is formed with a step structure on an inner side face thereof, and the step structure comprises a base portion in a form of hollowed closed shape and a surrounding wall protruding vertically from an outer edge of the base portion towards one side of the bas portion, and an upper surface of the base portion in the step structure functions as a step surface which faces towards the opening side of the back frame and is configured to support the display screen; the sealant frame is further provided with at least one positioning notch, each of which is formed to be recessed at a lower portion thereof into both the base portion and the surrounding wall of the step structure and to form a bottom wall of the positioning notch, and in turn to divide the step surface into segmented surfaces spaced apart from each other to cooperate collectively to function as a primary supporting surface configured to support the light guide element; and the membrane is provided with at least one positioning lug at an edge thereof, which is arranged to be positioned below the step surface and to extend into the positioning notch in a snap-fit manner; and the backlight module further comprises at least one positioning insert, which comprises a plate piece functioning as an auxiliary support whose upper surface further functions as an auxiliary supporting surface, and the auxiliary supporting surface is arranged to face towards the opening side of the back frame, the positioning insert being installed within a respective positioning notch and the auxiliary supporting surface being flush with the step surface.

According to an exemplary embodiment of the present disclosure, the positioning insert further comprises a plugging portion being located on the positioning insert at the same side as the auxiliary supporting surface of the auxiliary support; wherein the positioning notch comprises: a first notch, which is formed to be recessed inwards at an upper surface of the surrounding wall of the step structure and to face towards the opening side of the back frame; and a second notch, which is formed to be recessed inwards at the upper surface of the base portion of the step structure and to face towards the opening side of the back frame, and the first notch communicates with the second notch, the plugging portion is arranged to extend into the first notch and the positioning lug is arranged to extend into the second notch.

According to an exemplary embodiment of the present disclosure, the plugging portion is an insert block in a form of block shape, an inner side surface of the insert block facing inwards the sealant frame is flush with an inner wall surface of the surrounding wall of the step structure, and a top surface of the insert block is also flush with the upper surface of the surrounding wall of the step structure.

According to an exemplary embodiment of the present disclosure, the positioning insert is further provided with at least one clamping connector located at a bottom of the auxiliary support, and the positioning notch is provided with at least one mating portion on the bottom wall of the positioning notch, and the at least one clamping connector is configured to clip into place in the at least one mating portion respectively to position the positioning insert on the sealant frame.

According to an exemplary embodiment of the present disclosure, the at least one clamping connector is at least one hook provided at a lower portion of the positioning insert, and the at least one mating portion is at least one clamping slot provided on the bottom wall of the positioning notch, and the at least one hook is configured to be hooked and latched into the at least one clamping slot, respectively.

According to an exemplary embodiment of the present disclosure, the at least one hook and the at least one clamping slot are two hooks and two clamping slots, respectively, and the positioning lug is limited between the two hooks.

According to an exemplary embodiment of the present disclosure, the positioning insert is further provided with an auxiliary supporting plate functioning as the auxiliary support, both ends of the auxiliary supporting plate extend to the segmented surfaces of the step surface spaced apart from each other outside the positioning notch, respectively, and a plate surface of the auxiliary supporting plate facing towards the opening side of the back frame functions as the auxiliary supporting surface.

According to an exemplary embodiment of the present disclosure, two positioning slots opposite to each other are provided respectively on two of the segmented surfaces of the step surface spaced apart from each other outside the positioning notch, and dimensioned to have respective depths identical to a thickness of the auxiliary supporting plate, and arranged to extend towards side walls of the positioning notch adjacent thereto and to communicate with the positioning notch, and the auxiliary supporting plate is further configured to extend at both ends thereof into the two positioning slots, respectively.

According to an exemplary embodiment of the present disclosure, the at least one positioning notch are a plurality of sets of positioning notches, the at least one positioning insert are a plurality of sets of positioning inserts, and the at least one positioning lug are a plurality of sets of positioning lugs, and the plurality of sets of positioning inserts are formed by a same material as a material of the sealant frame, and the membrane comprises a diffusion sheet, a lower prism sheet, and an upper prism sheet.

According to an exemplary embodiment of the present disclosure, the two positioning slots are formed to be excavated to an inner wall surface of the surrounding wall of the step structure and directly communicate with the first notch, respectively.

According to a further embodiment of the present disclosure, the depths of the two positioning slots and the thickness of the auxiliary supporting plate are smaller than a thickness of the base portion of the step structure, and lower sides of the two positioning slots recessed into the base portion of the step structure are located higher than the bottom wall of the positioning notch.

According to an alternative further embodiment of the present disclosure, the depths of the two positioning slots and the thickness of the auxiliary supporting plate are equal to a thickness of the base portion of the step structure, and lower sides of the two positioning slots recessed into the base portion of the step structure are located to be flush with the bottom wall of the positioning notch.

According to an exemplary embodiment of the present disclosure, the two positioning slots are formed to be spaced apart from an inner wall surface of the surrounding wall of the step structure, respectively, without any direct communication with the first notch.

According to a further embodiment of the present disclosure, the depths of the two positioning slots and the thickness of the auxiliary supporting plate are smaller than a thickness of the base portion of the step structure, and lower sides of the two positioning slots recessed into the base portion of the step structure are located higher than the bottom wall of the positioning notch.

According to an alternative further embodiment of the present disclosure, the depths of the two positioning slots and the thickness of the auxiliary supporting plate are equal to a thickness of the base portion of the step structure, and lower sides of the two positioning slots recessed into the base portion of the step structure are located to be flush with the bottom wall of the positioning notch.

According to another aspect of the exemplary embodiment of the present disclosure, there is provided display device, comprising: the backlight module as above; the display screen, whose edges are supported on the step surface and the auxiliary surface; and an adhesive tape, adhered to locations of the opening of the back frame and edges of the display screen, and a top surface of the plugging portion is configured to support the adhesive tape across the positioning notch.

Other features and advantages of the embodiments of the present disclosure will be set forth in the following description, and they will be obvious in view of such a description or understood by those skilled in the art with reference to the embodiments of the present disclosure. Objectives and other advantages of the embodiments of the present disclosure can be realized and obtained by the structures particularly pointed out in the specification, the claims and the accompanying drawings.

BRIEF DESCRIPTION OF THE DRAWINGS

Accompanying drawings are to be used to provide a further understanding of the present disclosure and to constitute a part of the specification, and are to be comprehended together with the embodiments of the disclosure for facilitating interpretation of technical solutions of the disclosure, rather than being construed as a limitation to the technical schemes of the present disclosure.

DETAILED DESCRIPTION

Figure 1:
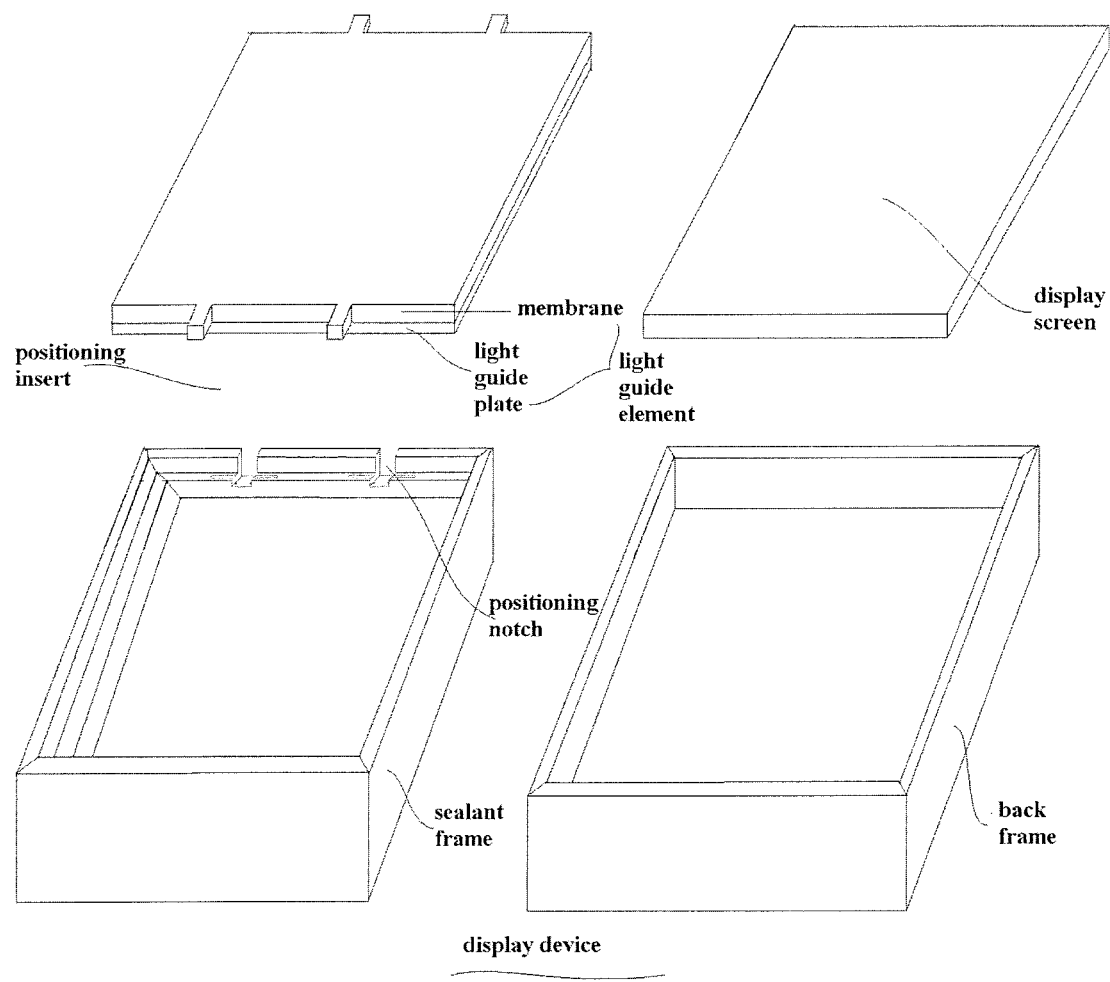
FIG. 1 illustrates a structural schematic view of a backlight module and a display device according to an embodiment of the present disclosure, with a local sectional view showing main components contained therein.

In order to make technical purposes, technical solutions and advantages of the embodiments of the present disclosure more clear, the embodiments of the present disclosure will be described in detail below with reference to the accompanying drawings. It should be noted that the embodiments of the present disclosure and the features in the embodiments may be freely combined with each other in case of no conflicts.

In the following detailed description, for facilitating a thorough and comprehensive understanding of the embodiments of the disclosure, numerous specific details are set forth hereinafter. It will be apparent, however, that one or more embodiments may be practiced by other ways different from those described herein; therefore, a scope of protection of embodiments of the disclosure may not be limited by following specific embodiments of the disclosure as below.

Respective dimension and shape of each component in the drawings are only intended to exemplarily illustrate the contents of the disclosure, rather than to demonstrate the practical dimension or proportion of components of a backlight module and a display device according to an embodiment of the disclosure.

A backlight module and a display device according to embodiments of the disclosure are described hereinafter in view of drawings.

Figure 2:
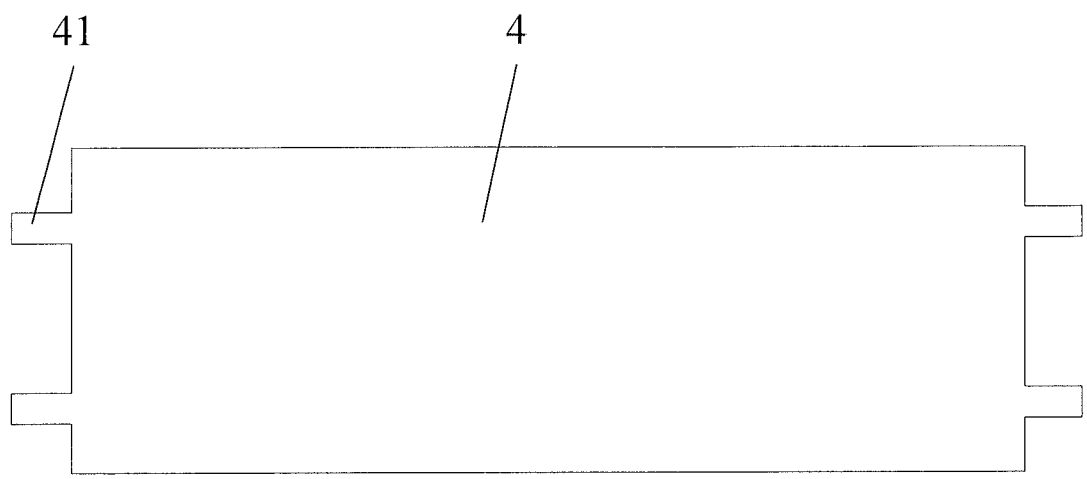
FIG. 2 illustrates a structural schematic view of a membrane according to an embodiment of the disclosure.
Figure 3A:
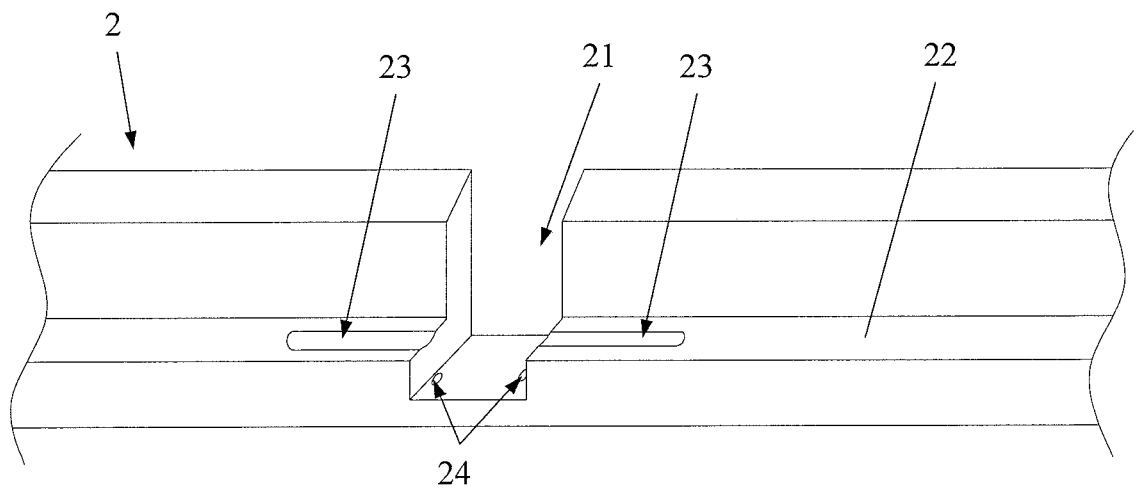
FIG. 3(a) illustrates a local structural schematic view of a sealant frame according to an embodiment of the disclosure.
Figure 3B:
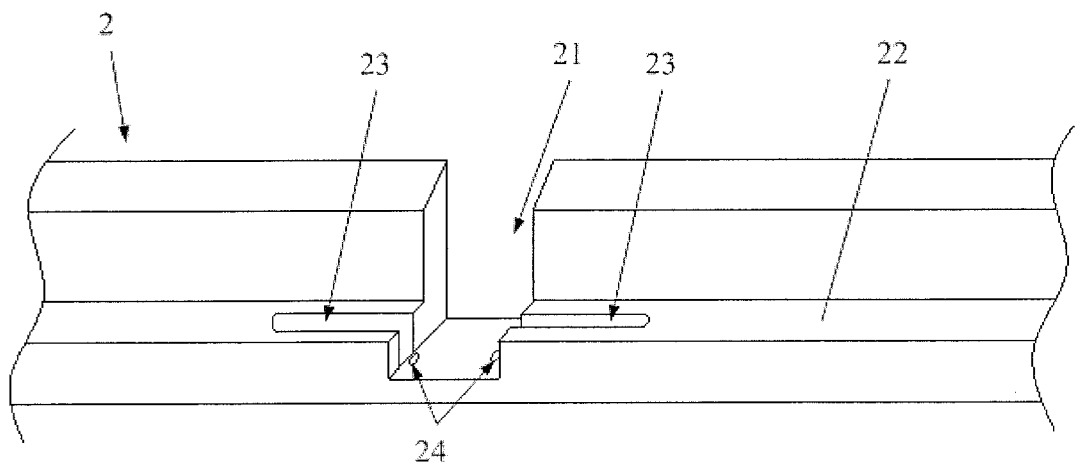
FIG. 3(b) illustrates a local structural schematic view of a sealant frame according to another embodiment of the disclosure.
Figure 3C:
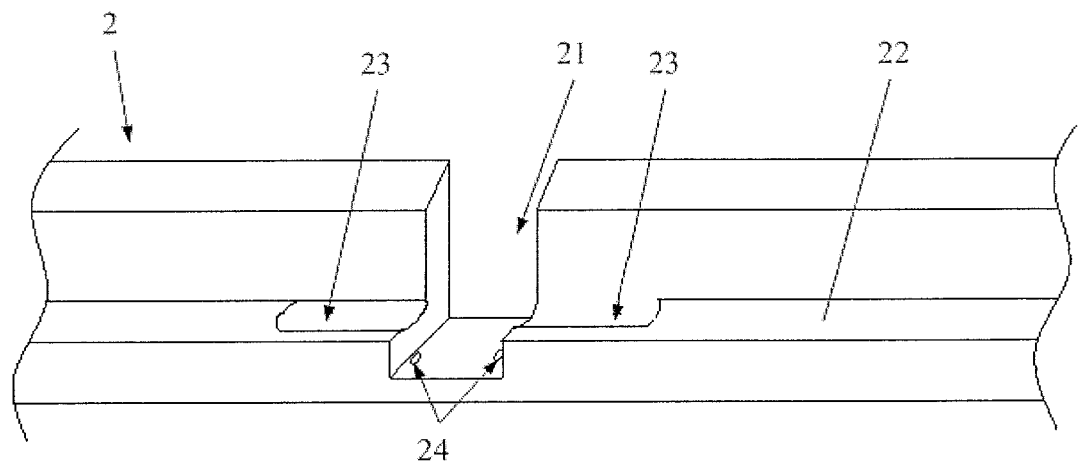
FIG. 3(c) illustrates a local structural schematic view of a sealant frame according to still another embodiment of the disclosure.
Figure 3D:
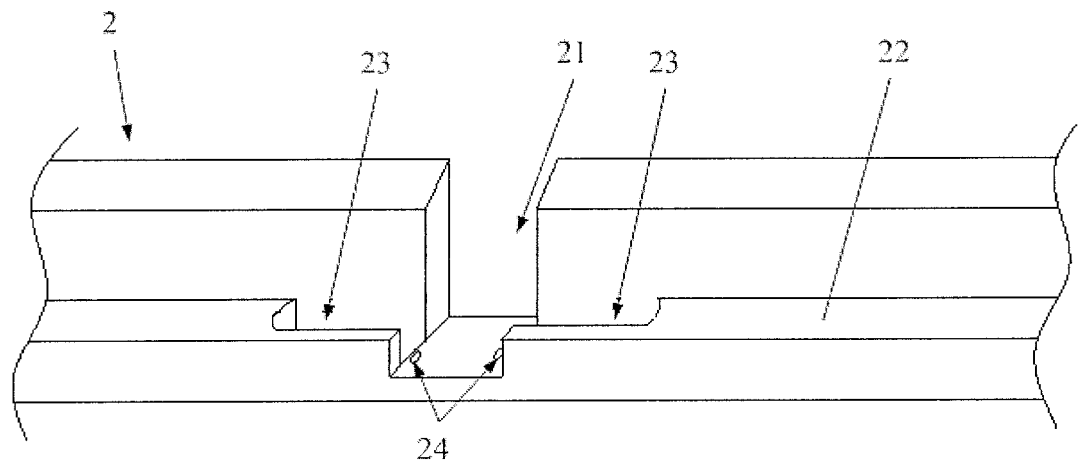
FIG. 3(d) illustrates a local structural schematic view of a sealant frame according to yet another embodiment of the disclosure.

According to a general technical concept of the embodiments of the disclosure, in an aspect of embodiments of the disclosure, as illustrated, by way of example, a backlight module configured to support a display screen is provided in an embodiment of the disclosure, comprising: a back frame 1, which is in a box shape and opens at an opening side thereof, and may also for example be referred to as a back plate; a sealant frame 2, which is in a form of hollowed closed frame and is accommodated within the back frame 1 by abutting against inside of the back frame 1, as illustrated in FIG. 1 and FIGS. 3(a) to 3(d), specifically, for example is placed therein from the opening side of the back frame 1 until a flat lower surface of the sealant frame 2 abuts against the inner bottom portion of the back frame 1; and a light guide element, which fits with the back frame and the sealant frame (e.g., as illustrated in FIG. 1 and the local sectional view therein), and for example comprises a light guide plate 3 and a membrane 4 (as illustrated in FIG. 2), both the light guide plate 3 and the membrane 4 being in turn located within a region surrounded by the sealant frame 2, and the membrane 4 being further located on the light guide plate.

In a more specific embodiment, e.g., as illustrated in FIG. 3(a) to FIG. 3(d), the sealant frame 2 is formed with a step structure on an inner side face thereof, and the step structure comprises a base portion in a form of hollowed closed shape and a surrounding wall protruding vertically from an outer edge of the base portion towards one side of the base portion; and more specifically, by way of example, when the sealant frame 2 is about to be installed into the back frame 1, the step structure is arranged such that, a lower surface of the base portion faces towards a bottom side of the back frame opposite to the opening side of the back frame and the surrounding wall protrudes towards the opening side of the back frame, and both an upper surface of the surrounding wall and an upper surface of the base portion, which is referred to as step surface 22 hereinafter and located lower than the former (i.e., the upper surface of the surrounding wall) face towards the opening side of the back frame, and the step surface 22 is configured to support the light guide element and the display screen covering the backlight module (especially covering the light guide element).

In a further embodiment, the sealant frame 2 is further provided with at least one positioning notch 21, each of which is formed to be recessed at a lower potion thereof into both the base portion and the surrounding wall of the step structure and to form a flat bottom surface (referred to as "bottom wall" hereinafter) of the positioning notch, and in turn to divide the step surface 22 into segmented surfaces at least partially spaced apart from each other or one another to cooperate collectively to function as a primary supporting surface configured to support the light guide element; and then the positioning notch 21 divide the sealant frame 2 into sealant frame segments at least partially spaced apart from each other or one another. Correspondingly, the membrane 4 is provided with at least one positioning lug 41 at an edge thereof, e.g., as illustrated in FIG. 2, one or two positioning lugs may be designed to be arranged on each of two side portions of the membrane 4 in a short edge direction of the sealant frame, respectively; and when the at least one positioning lug 41 is being installed, it may be arranged to be positioned below the step surface 22 and to extend into the at least one positioning notch 21 in a snap-fit manner, respectively.

Figure 4A:
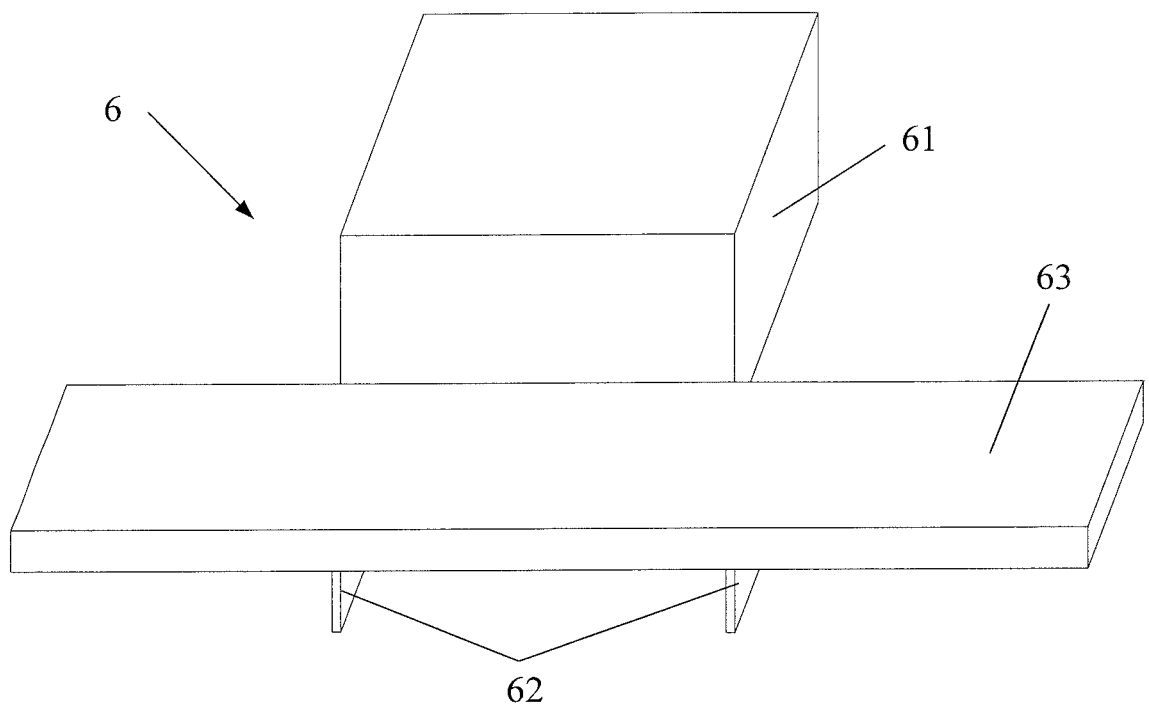
FIG. 4(a) illustrates a structural schematic view of a positioning insert according to an embodiment of the disclosure.
Figure 4B:
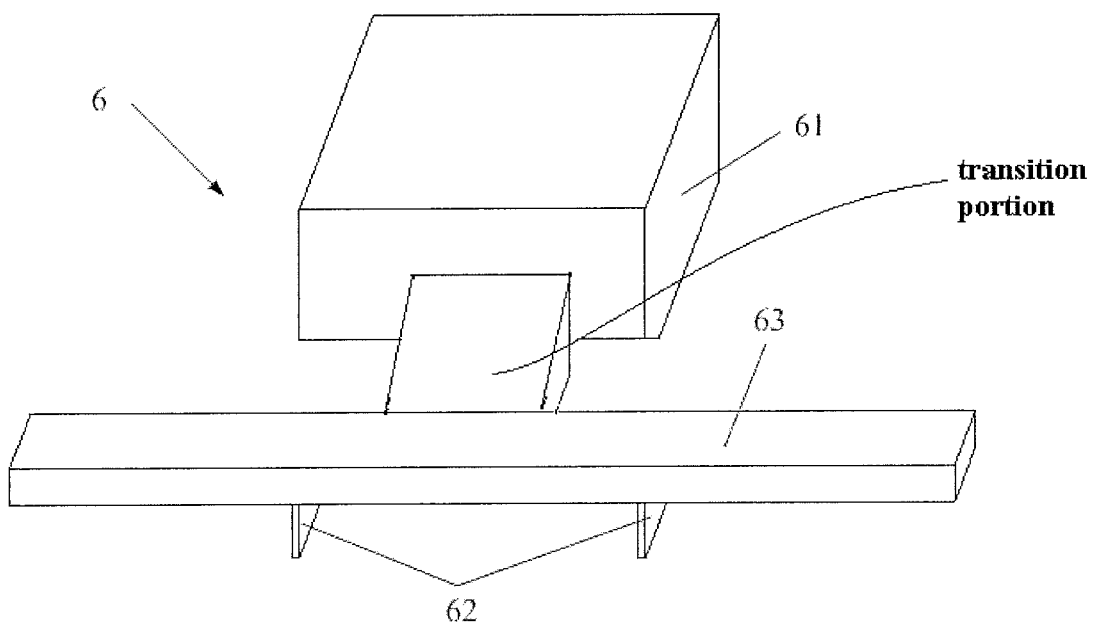
FIG. 4(b) illustrates a structural schematic view of a positioning insert according to another embodiment of the disclosure.

In a further embodiment, the backlight module for example further comprises at least one positioning insert 6 (as illustrated in FIG. 4(*a*) and FIG. 4(*b*)), and the at least one positioning insert 6 for example has a same number as the number of the at least one positioning notch 21, and each positioning insert 6 for example comprise a plate piece 63 functioning as an auxiliary support whose upper surface (e.g., a flat upper surface thereof) further functions as an auxiliary supporting surface for supporting the light guide element; specifically, once the positioning insert 6 is inserted and fitted into a respective positioning notch 21, then the auxiliary supporting surface is arranged to face towards the opening side of the back frame, and the auxiliary supporting surface is flush with the step surface 22.

As to the backlight module provided in the embodiment of the disclosure, the auxiliary supporting surface, and the step surface 22 which comprises segmented surfaces spaced apart from each other, may cooperate collectively to form a closed ring shaped (e.g., in a form of hollowed rectangular shape) supporting structure whose surface is smooth without any step mismatch, and in turn to provide a support for edges of the display screen, and to prevent occurrence of a light leakage at the auxiliary supporting surface in a condition of black picture(s) and in turn any adverse influence on the display effect of the display screen.

By way of example, as illustrated in FIG. 3(*a*) to FIG. 3(*d*) and FIG. 4(*a*) to FIG. 4(*b*), the positioning insert 6 further comprises a plugging portion (or a blocking portion) 61 being located on the positioning insert at the same side as the auxiliary supporting surface 63 of the auxiliary support 61, and the number of the plugging portions 61 may for example be the same as the number of the positioning inserts 6. Correspondingly, by way of example, as illustrated in FIG. 3(*a*) to FIG. 3(*d*), the positioning notch 21 comprises a first notch and a second notch, the first notch is formed to be recessed inwards at an upper surface of the surrounding wall of the step structure and to face towards the opening side of the back frame, and the second notch is formed to be recessed inwards at the upper surface of the base portion of the step structure and to face towards the opening side of the back frame, the first notch communicates with the second notch; and as illustrated in FIG. 3(*a*) to FIG. 3(*d*), a portion of the first notch below the step surface 22 is aligned with and communicates with the second notch, e.g., in a lateral outward direction, i.e., a direction perpendicular to the paper sheet and pointing inwards as illustrated in FIG. 3(*a*) to FIG. 3(*d*); in other words, respective bottom sides of the first notch and the second notch are flush with each other as illustrated. The plugging portion is arranged to extend into the first notch and the positioning lug 41 is arranged to extend into the second notch.

In a further embodiment, once the plugging portion 61 is inserted into the first notch and then an adhesive tape is adhered to locations of the opening of the back frame and edges of the display screen, and a top surface of the plugging portion is configured to support the adhesive tape across the positioning notch, for example, the adhesive tape is equivalent to the second adhesive tape as in relevant art, then, the plugging portion and the sealant frame (the sealant frame segments at least partially spaced apart from each other or one another by the positioning notch 21, especially by the first notch thereof) may cooperate with each other to support the adhesive tape which has been adhered in position, prevent the adhesive tape from collapsing inwards the first notch and in turn prevent from causing any step mismatch thus incurred, and thus avoiding problem such as upward tiling of the adhesive tape and the like and light leakage thus caused by the upward tiling, so as to better ensure the display effect of the display screen and to prevent occurrence of white light rays in a black picture.

Specifically, as illustrated in FIG. 3(*a*) to FIG. 3(*d*) and FIG. 4(*a*) to FIG. 4(*b*), the plugging portion is for example embodied as an insert block 61 in a form of block shape, an inner side surface of the insert block 61 facing inwards the sealant frame is flush with an inner wall surface of the surrounding wall of the step structure, and a top surface of the insert block 61 is also flush with the upper surface of the surrounding wall of the step structure.

Furthermore, as illustrated in FIG. 3(*a*) to FIG. 3(*d*) and FIG. 4(*a*) to FIG. 4(*b*), the positioning insert 6 is for example additionally provided with at least one clamping connector 62 located at a bottom of the auxiliary support, each clamping connector 62 may for example extend as illustrated, i.e., vertically from the auxiliary support to a side of the respective positioning insert 61 opposite to the auxiliary supporting surface of the auxiliary support 63, e.g., each clamping connector 62 may extend vertically downwards as illustrated; and correspondingly, the positioning notch 21 is provided with at least one mating portion 24 on the flat bottom surface (i.e., the bottom wall) of the positioning notch 21, and the at least one clamping connector 62 is configured to be in positive fit with (e.g., clip into place in) the at least one mating portion 24 respectively to position the positioning insert 6 on the sealant frame 2 more securely so as to prevent the positioning insert 6 from being loosen in use. More specifically, by way of example, the at least one clamping connector 62 may be arranged to be assembled into the second notch of the positioning notch 21 recessed inwards the step structure to reach the base portion of the step structure, and a tip end of the at least one clamping connector 62 may be at least in positive fit with the at least one mating portion 24 respectively, e.g., being fitted with each other by fit insertion.

Specifically, as illustrated in FIG. 3(*a*) to FIG. 3(*d*) and FIG. 4(*a*) to FIG. 4(*b*), by way of example, the at least one clamping connector 62 is at least one hook provided at a lower portion of the positioning insert 6, and the at least one mating portion 24 is at least one clamping slot provided on the bottom wall of the positioning notch 21, and the at least one hook is configured to be hooked and latched into the at least one clamping slot, respectively. And each positioning insert 6 comprises two said hooks while each positioning notch 21 comprises two said clamping slots located on the bottom wall thereof; i.e., the at least one hook and the at least one clamping slot are two hooks and two clamping slots, respectively. And the two hooks are configured to be hooked and latched into the two clamping slots respectively and further configured to limit the respective positioning lug 41 in place between the two hooks, and in turn to cooperate with the auxiliary support 63 to limit the positioning lug 41 in a spatial range which is surrounded and delimited by the bottom wall, the two hooks and the auxiliary support 63 collectively; and a spacing between the two hooks is set to reserve an expansion margin space for remaining restriction on the positioning lug 41 in consideration that the positioning lug 41 changes its volume due to its expansion.

Furthermore, as illustrated in FIG. 3(*a*) to FIG. 3(*d*) and FIG. 4(*a*) to FIG. 4(*b*), the positioning insert 6 is further provided with an auxiliary supporting plate 63 functioning as the auxiliary support, both ends of the auxiliary supporting plate 63 extend to the segmented surfaces of the step surface 22 spaced apart from each other outside the positioning notch 21, respectively, and a plate surface of the auxiliary supporting plate 63 facing towards the opening side of the back frame functions as the auxiliary supporting surface, and the auxiliary plate 63 covers the positioning notch 21 between the segmented surfaces of the step surface spaced apart from each other, so as to shield light rays being incident thereon, and in turn to prevent light rays from irradiating upwards onto the display screen.

Specifically, by way of example, as illustrated in FIG. 3(*a*) to FIG. 3(*d*) and FIG. 4(*a*) to FIG. 4(*b*), two positioning slots 23 opposite to each other are provided respectively on two of the segmented surfaces of the step surface 22 spaced apart from each other outside the positioning notch 21, and are dimensioned to have respective depths identical to a thickness of the auxiliary supporting plate 63, and the two positioning slots 23 are arranged to extend towards side walls of the positioning notch 21 adjacent thereto and to communicate with the positioning notch 21. And the auxiliary supporting plate 63 is further configured to extend at both ends thereof into the two positioning slots 23, respectively, so as to position the auxiliary supporting plate 63 with the aid of the positioning slots 23 and in turn to better define an installation position of the auxiliary supporting plate 63 and to simultaneously achieve an effect that the auxiliary supporting surface is flush with the step surface 22.

In an embodiment, as illustrated in FIG. 3(*c*) and FIG. 3(*d*), the two positioning slots 23 are formed to be excavated to an inner wall surface of the surrounding wall of the step structure and directly communicate with the first notch, respectively. Corresponding, as illustrated in FIG. 4(*a*), the plugging portion 61 and the auxiliary support 63 abut against each other and form integrally into one piece.

Moreover, in a further embodiment, as illustrated in FIG. 3(*c*), the depths of the two positioning slots 23 and the thickness of the auxiliary supporting plate 63 are smaller than a thickness of the base portion of the step structure; i.e., lower sides (or at least respective location most deeply recessed into the base portion) of the two positioning slots recessed into the base portion of the step structure are located higher than the bottom wall of the positioning notch 21, respectively.

In an alternative further embodiment, as illustrated in FIG. 3(*d*), the depths of the two positioning slots 23 and the thickness of the auxiliary supporting plate 63 are equal to a thickness of the base portion of the step structure, i.e., lower sides (or at least respective location most deeply recessed into the base portion) of the two positioning slots recessed into the base portion of the step structure are located to be flush with the bottom wall of the positioning notch 21, respectively.

In an embodiment, as illustrated in FIG. 3(*a*) and FIG. 3(*b*), the two positioning slots are formed to be spaced apart from an inner wall surface of the surrounding wall of the step structure, respectively, without any direct communication with the first notch. Correspondingly, as illustrated in FIG. 4(*b*), the plugging portion 61 and the auxiliary support 63 indirectly connect with each other via a transition portion therebetween and form integrally into one piece.

Moreover, in a further embodiment, as illustrated in FIG. 3(*a*), the depths of the two positioning slots 23 and the thickness of the auxiliary supporting plate 63 are smaller than a thickness of the base portion of the step structure, i.e., lower sides (or at least respective location most deeply recessed into the base portion) of the two positioning slots 23 recessed into the base portion of the step structure are located higher than the bottom wall of the positioning notch 21, respectively.

In an alternative further embodiment, as illustrated in FIG. 3(*b*), the depths of the two positioning slots 23 and the thickness of the auxiliary supporting plate 63 are equal to a thickness of the base portion of the step structure, i.e., lower sides (or at least respective location most deeply recessed into the base portion) of the two positioning slots recessed into the base portion of the step structure are located to be flush with the bottom wall of the positioning notch 21, respectively.

More specifically, the at least one positioning notch 21 are a plurality of sets of positioning notches (e.g., two or four sets symmetrically provided), the at least one positioning insert 6 are a plurality of sets of positioning inserts 6 (e.g., two or four sets symmetrically provided), and the at least one positioning lug 41 are a plurality of sets of positioning lugs (e.g., two or four sets symmetrically provided), and the plurality of sets of positioning inserts 6 are formed by a same material as a material of the sealant frame 2, with a relatively high strength so as to better support the display screen and to prevent any step mismatch being formed between the positioning insert 6 and the step surface 22; and more specifically, the membrane 4 for example further comprises a diffusion sheet, a lower prism sheet, and an upper prism sheet. Additionally, a reflector sheet may further be provided below the light guide plate.

In another aspect of embodiments of the disclosure, a display device is provided, as illustrated in FIG. 1, comprising: the backlight module according to any one of above embodiments; the display screen covering the light guide element of the backlight module, with edges of the display device being supported on the step surface 22 and the auxiliary surface; and an adhesive tape, which is adhered to locations of the opening of the back frame and edges of the display screen, and is supported thereat by a top surface of the plugging portion 61 across the positioning notch 21, preventing problem such as collapsing or upwards tiling of the adhesive tape and the like and light leakage caused by collapsing or upwards tiling, The display device according to an embodiment of the disclosure possesses all advantages of the backlight module according to any embodiment as above, without repeating herein any more.

And the display device is for example a laptop computer.

Embodiments of the disclosure have beneficial effects as below:

In summary, as to the backlight module according to embodiments of the disclosure, the auxiliary supporting surface and the step surface form collectively a closed ring shaped supporting structure whose surface is smooth, so as to eliminate any step mismatch existing at the positioning notch of the step surface, and in turn to provide a support for edges of the display screen, and to prevent occurrence of a light leakage at the auxiliary supporting surface in a condition of black picture(s).

In the present disclosure, unless explicitly stated or defined otherwise, the terms such as "mount", "connect", "connected", "fixed" and the like, are to be understood broadly, and may include a fixed connection, a detachable connection or integrally formed; may be directly connected or indirectly connected through an intermediate medium. For those skilled in the art, the specific meanings of the above terms in the present disclosure may be understood according to specific cases.

In the description of the present specification, the terms "an embodiment", "another embodiment" or the like means that the specific features, structures, materials or characteristics described in connection with the embodiments are included in at least one embodiment of the present disclosure. In the present specification, the schematic representation of the above terms is not necessarily directed to the same embodiment or example. Furthermore, the specific features, structures, materials, or characteristics described may be incorporated in a suitable manner in any one or more embodiments or examples.

The embodiments disclosed in the present disclosure are as described above, but they are merely provided to facilitate the understanding of the present disclosure, and are not intended to limit the present disclosure. Any modifications and variations may be made by those skilled in the art in terms of form and detail without departing from the spirit and scope of the present disclosure, but the scope of the present disclosure is defined by the appended claims

What is claimed is:

1. A backlight module configured to support a display screen, comprising:
a back frame which is in a box shape and opens at an opening side thereof;
a sealant frame which is in a form of hollowed closed frame and is accommodated within the back frame by abutting against inside of the back frame; and
a light guide element which fits with the back frame and the sealant frame, and comprises a light guide plate and a membrane, both the light guide plate and the membrane being located within a region surrounded by the sealant frame, and the membrane being further located on the light guide plate;
wherein the sealant frame is formed with a step structure on an inner side face thereof, and the step structure comprises a base portion in a form of hollowed closed shape and a surrounding wall protruding vertically from an outer edge of the base portion towards one side of the base portion, and an upper surface of the base portion in the step structure functions as a step surface which faces towards the opening side of the back frame and is configured to support the display screen;
wherein the sealant frame is further provided with at least one positioning notch, each of which is formed to be recessed at a lower portion thereof into both the base portion and the surrounding wall of the step structure and to form a bottom wall of the positioning notch, and in turn to divide the step surface into segmented surfaces spaced apart from each other to cooperate collectively to function as a primary supporting surface configured to support the light guide element; and the membrane is provided with at least one positioning lug at an edge thereof, which is arranged to be positioned below the step surface and to extend into the positioning notch in a snap-fit manner; and
wherein the backlight module further comprises at least one positioning insert, which comprises a plate piece functioning as an auxiliary support whose upper surface further functions as an auxiliary supporting surface, and the auxiliary supporting surface is arranged to face towards the opening side of the back frame, the positioning insert being installed within a respective positioning notch and the auxiliary supporting surface being flush with the step surface.

2. The backlight module according to claim 1, wherein the positioning insert further comprises a plugging portion being located on the positioning insert at the same side as the auxiliary supporting surface of the auxiliary support;
wherein the positioning notch comprises:
a first notch, which is formed to be recessed inwards at an upper surface of the surrounding wall of the step structure and to face towards the opening side of the back frame;
a second notch, which is formed to be recessed inwards at the upper surface of the base portion of the step structure and to face towards the opening side of the back frame, and
wherein the first notch communicates with the second notch, the plugging portion is arranged to extend into the first notch and the positioning lug is arranged to extend into the second notch.

3. The backlight module according to claim 2, wherein the plugging portion is an insert block in a form of a block shape, an inner side surface of the insert block facing inwards the sealant frame is flush with an inner wall surface of the surrounding wall of the step structure, and a top surface of the insert block is also flush with the upper surface of the surrounding wall of the step structure.

4. The backlight module according to claim 2, wherein the positioning insert is further provided with at least one clamping connector located at a bottom of the auxiliary support, and the positioning notch is provided with at least one mating portion on the bottom wall of the positioning notch, and the at least one clamping connector is configured to clip into place in the at least one mating portion respectively to position the positioning insert on the sealant frame.

5. The backlight module according to claim 4, wherein the at least one clamping connector is at least one hook provided at a lower portion of the positioning insert, and the at least one mating portion is at least one clamping slot provided on the bottom wall of the positioning notch, and the at least one hook is configured to be hooked and latched into the at least one clamping slot, respectively.

6. The backlight module according to claim 5, wherein the at least one hook and the at least one clamping slot are two hooks and two clamping slots, respectively, and the positioning lug is limited between the two hooks.

7. The backlight module according to claim 1, wherein the positioning insert is further provided with an auxiliary supporting plate functioning as the auxiliary support, both ends of the auxiliary supporting plate extend to the segmented surfaces of the step surface spaced apart from each other outside the positioning notch, respectively, and a plate surface of the auxiliary supporting plate facing towards the opening side of the back frame functions as the auxiliary supporting surface.

8. The backlight module according to claim 7, wherein two positioning slots opposite to each other are provided respectively on two of the segmented surfaces of the step surface spaced apart from each other outside the positioning notch, and dimensioned to have respective depths identical to a thickness of the auxiliary supporting plate, and arranged to extend towards side walls of the positioning notch adjacent thereto and to communicate with the positioning notch, and wherein the auxiliary supporting plate is further configured to extend at both ends thereof into the two positioning slots, respectively.

9. The backlight module according to claim 1, wherein the at least one positioning notch are a plurality of sets of positioning notches, the at least one positioning insert are a plurality of sets of positioning inserts, and the at least one positioning lug are a plurality of sets of positioning lugs, and the plurality of sets of positioning inserts are formed by a same material as a material of the sealant frame, and the membrane comprises a diffusion sheet, a lower prism sheet, and an upper prism sheet.

10. A display device, comprising:
the backlight module according to claim 2;
the display screen, whose edges are supported on the step surface and the auxiliary surface; and
an adhesive tape, adhered to locations of the opening of the back frame and edges of the display screen, and a top surface of the plugging portion is configured to support the adhesive tape across the positioning notch.

11. The backlight module according to claim 8, wherein the two positioning slots are formed to be excavated to an inner wall surface of the surrounding wall of the step structure and directly communicate with the first notch, respectively.

12. The backlight module according to claim 11, wherein the depths of the two positioning slots and the thickness of the auxiliary supporting plate are smaller than a thickness of the base portion of the step structure, and lower sides of the two positioning slots recessed into the base portion of the step structure are located higher than the bottom wall of the positioning notch.

13. The backlight module according to claim 11, wherein the depths of the two positioning slots and the thickness of the auxiliary supporting plate are equal to a thickness of the base portion of the step structure, and lower sides of the two positioning slots recessed into the base portion of the step structure are located to be flush with the bottom wall of the positioning notch.

14. The backlight module according to claim 8, wherein the two positioning slots are formed to be spaced apart from an inner wall surface of the surrounding wall of the step structure, respectively, without any direct communication with the first notch.

15. The backlight module according to claim 14, wherein the depths of the two positioning slots and the thickness of the auxiliary supporting plate are smaller than a thickness of the base portion of the step structure, and lower sides of the two positioning slots recessed into the base portion of the step structure are located higher than the bottom wall of the positioning notch.

16. The backlight module according to claim 14, wherein the depths of the two positioning slots and the thickness of the auxiliary supporting plate are equal to a thickness of the base portion of the step structure, and lower sides of the two positioning slots recessed into the base portion of the step structure are located to be flush with the bottom wall of the positioning notch.

* * * * *